United States Patent
Haas et al.

(10) Patent No.: US 7,954,902 B2
(45) Date of Patent: Jun. 7, 2011

(54) SEAT BELT FITTING FOR A REVERSIBLE SEAT

(75) Inventors: Michael Haas, Karsbach (DE); Ralf Hoge, Radevormwald (DE); Armin Amend, Neuendorf (DE); Wolfgang Kroner, Florsbachtal (DE)

(73) Assignee: Intier Automotive Seating Systems GmbH, Sailauf (DE)

( * ) Notice: Subject to any disclaimer, the term of this patent is extended or adjusted under 35 U.S.C. 154(b) by 336 days.

(21) Appl. No.: 12/158,751

(22) PCT Filed: Dec. 21, 2006

(86) PCT No.: PCT/EP2006/012388
§ 371 (c)(1),
(2), (4) Date: Jun. 23, 2008

(87) PCT Pub. No.: WO2007/071418
PCT Pub. Date: Jun. 28, 2007

(65) Prior Publication Data
US 2008/0265643 A1  Oct. 30, 2008

(30) Foreign Application Priority Data
Dec. 22, 2005  (DE) .................. 10 2005 061 541

(51) Int. Cl.
*B60R 22/00* (2006.01)
*A62B 35/00* (2006.01)
*B60N 2/04* (2006.01)
*B60N 2/24* (2006.01)

(52) U.S. Cl. .................. 297/483; 297/94; 297/95

(58) Field of Classification Search ............. 297/468, 297/483, 355.21, 344.22, 94, 95
See application file for complete search history.

(56) References Cited

U.S. PATENT DOCUMENTS

| | | | | |
|---|---|---|---|---|
| 3,080,634 A | * | 3/1963 | Lindblad | 280/801.1 X |
| 3,691,788 A | * | 9/1972 | Mazziotti | 464/139 |
| 4,009,510 A | * | 3/1977 | Lindblad | 297/483 X |
| 4,159,848 A | * | 7/1979 | Manz et al. | 297/483 X |
| 4,306,735 A | * | 12/1981 | Pfeiffer et al. | 280/807 |
| 4,312,539 A | * | 1/1982 | Takada | 297/468 |
| 4,431,330 A | * | 2/1984 | Darnell | 403/122 |
| 4,549,769 A | * | 10/1985 | Pilarski | 297/483 |
| 4,582,340 A | * | 4/1986 | Fohl | 297/483 X |
| 4,648,625 A | * | 3/1987 | Lynch | 297/483 X |
| 4,838,388 A | * | 6/1989 | Cunningham | 297/483 X |
| 5,544,917 A | * | 8/1996 | Loxton et al. | 280/801.2 |
| 5,556,171 A | * | 9/1996 | Busch | 297/483 |
| 5,599,070 A | | 2/1997 | Pham et al. | |
| 5,609,396 A | | 3/1997 | Loxton et al. | |
| 5,658,051 A | * | 8/1997 | Vega et al. | 297/483 |
| 5,722,732 A | * | 3/1998 | Haldenwanger | 297/483 |
| 5,730,499 A | * | 3/1998 | Salisbury, Jr. | 297/483 X |

(Continued)

FOREIGN PATENT DOCUMENTS

| | | |
|---|---|---|
| DE | 2812824 A1 | 9/1978 |
| DE | 3715861 A1 | 12/1988 |
| DE | 10034441 A1 | 1/2002 |
| DE | 10358719 A1 | 7/2005 |
| DE | 102005004954 A1 | 11/2005 |

(Continued)

*Primary Examiner* — Rodney B White
(74) *Attorney, Agent, or Firm* — Magna International Inc.

(57) ABSTRACT

In order to allow use of the seat belt in both positions of use of a reversible seat, an articulated end fitting is proposed for connecting a seat belt to the reversible seat, with a connecting part (51) and a projecting elongate lug (53) connected thereto for suspending a seat belt, the elongate lug (53) being pivotable relative to the connecting part (51) about three different axes (A, B, C).

13 Claims, 7 Drawing Sheets

U.S. PATENT DOCUMENTS

| | | | | |
|---|---|---|---|---|
| 5,988,758 A | * | 11/1999 | Heintzelman et al. | 297/483 |
| 6,065,810 A | * | 5/2000 | Koenig et al. | 297/482 |
| 6,520,588 B1 | * | 2/2003 | Busch | 297/483 |
| 7,380,833 B2 | * | 6/2008 | Bronner et al. | 297/483 X |

FOREIGN PATENT DOCUMENTS

| | | |
|---|---|---|
| EP | 0215220 A1 | 3/1987 |
| WO | WO 01/70537 A | 9/2001 |
| WO | WO 2004/074052 A1 | 9/2004 |

* cited by examiner

SEAT BELT FITTING FOR A REVERSIBLE SEAT

The present invention relates to an end fitting for connecting a seat belt to a reversible seat in a motor vehicle. The present invention further relates to an upper deflection fitting for a reversible seat in a motor vehicle. The present invention further relates to a seat belt arrangement for a reversible seat with a deflection fitting and/or end fitting and a reversible seat with a seat belt arrangement.

Reversible seats, frequently also denoted as 'reversible vehicle seats', are known. The international patent application WO 01/70537 A1, for example, discloses a reversible seat which may be displaced into the most varied seating and reclining positions, and of which the backrest may be pivoted from a front end of a seat surface to a rear end of the seat surface and vice versa. According to one of its embodiments, the present invention specifically relates to such a reversible seat with the pivoting mechanism which is shown in the aforementioned publication.

A further mechanism for reversing the seat direction of a passenger on a motor vehicle seat is disclosed in the publication DE 103 58 719 A1. The design of a seat facing in two directions and disclosed here, with a backrest part which may be used on both sides and in which the seat surface and the backrest are arranged to be decoupled from one another, may also be used within the scope of the present invention.

Seats with a backrest which is reversible and/or may be inverted have the advantage that a rotation of the seat about a vertical axis, as was previously provided for reversing the seat direction so that a passenger is able to sit down on the seat either in the direction of travel or opposing the direction of travel, is dispensed with. Such a rotation is disadvantageous, due to the restricted spatial conditions in motor vehicles and due to the anchorage of the seat in the vehicle floor which is frequently weakened by the rotary mechanism.

In contrast to the rotatable seats, the appropriate connection of a seat belt is more complicated with reversible seats. In practice, this has been partially countered by the fact that a seat belt might not be required in the reverse seating position or such a use of the seat might not be allowed during the journey. An adapted seat belt for a reversible seat would, however, be desirable in many cases.

The object of the present invention, therefore, is to allow an end fitting for a seat belt arrangement on a reversible seat which allows a use of the seat belt in both positions of use. In a further aspect, the object of the present invention is to provide a reversible seat with a seat belt arrangement in which the seat belt may be used in both of the envisaged positions of use.

In a first aspect, the present invention achieves these objects by a fitting arrangement for a seat belt on a reversible seat with the features according to claim 1 and a reversible seat with the features according to claim 5.

In a second aspect, the object set forth is further achieved by the invention by a reversible seat with an upper deflection fitting, according to the features provided in claim 8.

Advantageous embodiments and developments of the present invention are provided in the respective sub-claims.

The present invention is disclosed by way of example hereinafter, reference being made to the accompanying drawings, in which.

Figure 1:
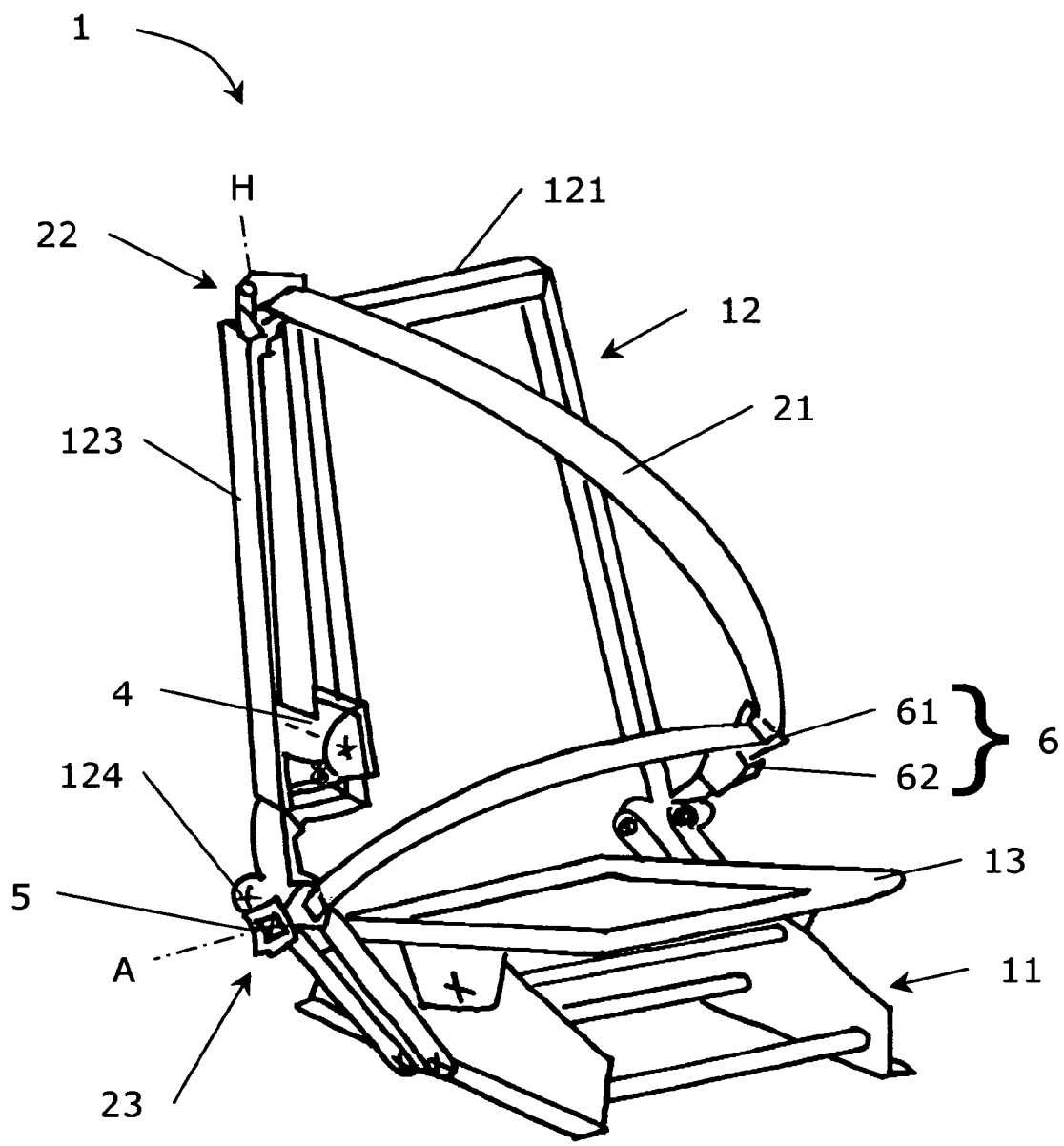
FIG. 1 is a perspective view of the structure of a reversible seat with a seat belt arrangement according to the present invention in a first position of use.

According to FIG. 1 to FIG. 4, a reversible seat 1 for a vehicle and, in particular, for the front passenger seat in a motor vehicle, comprises a seat base 11 with a backrest 12 movably attached thereto. For the sake of clarity, the upholstery placed on the seat structure is not shown. The reversible seat 1 may be altered between two positions of use by displacing the backrest 12. The reversible seat 1 further comprises a seat belt arrangement 2 with a seat belt 21 and a fitting set. The fitting set, in turn, comprises a number of fitting elements 3, 4, 5, 6 for the guidance and partially releasable connection of the seat belt 21 to the reversible seat 1. An articulated end fitting 5, a deflection fitting 3, a seat belt buckle 6 and a belt retractor 4 are, in particular, provided. In the variant shown, the seat belt 21 extends away from the belt retractor 4 inside the backrest 12, approximately along the centre plane of the backrest 12 upwardly as far as an upper deflection point 22. Proceeding therefrom, the seat belt 21 crosses the upper body of the passenger and is deflected in the opposing seat belt buckle 6 in an approximately horizontal strand which crosses the lower body of the passenger. The end of the seat belt 21 is held in an articulated end fitting 5. The cooperation of the aforementioned fitting elements 3, 4, 5, 6 with the reversing function of the reversible seat 1 is disclosed hereinafter in further detail.

Figure 2:
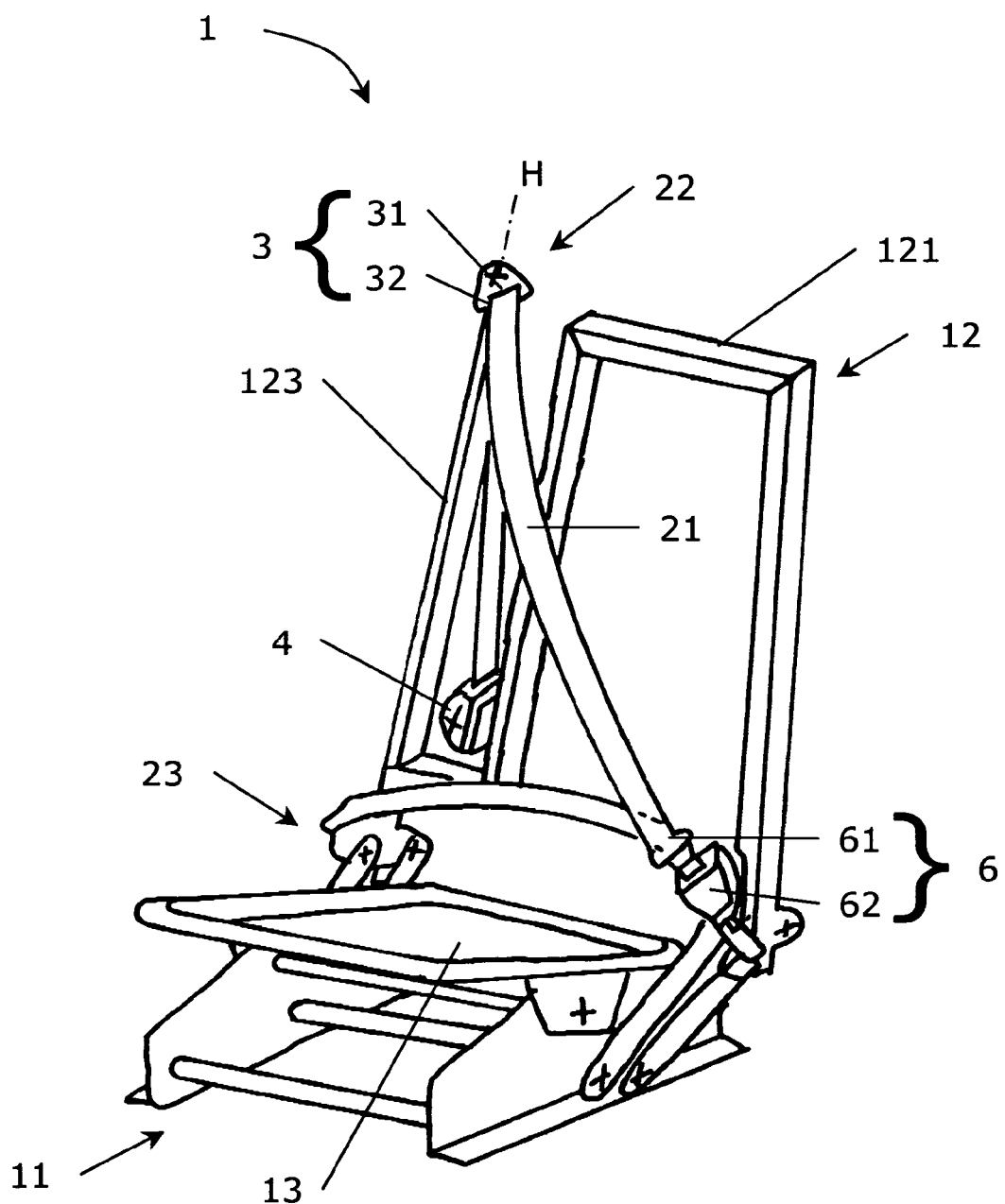
FIG. 2 is a perspective view of the reversible seat according to FIG. 1 from a different viewing angle.

In the first position of use of the reversible seat 1 according to FIG. 1 and FIG. 2, the backrest 12 is located with an upper edge 121 projecting slightly to the left at the left end of the seat surface 13. The reversible seat 1 may be used with the viewing direction towards the right. In this first position of use, the seat belt 21 according to the illustration has to be guided on the right side in front of the backrest 12 and along the passenger.

Figure 3:
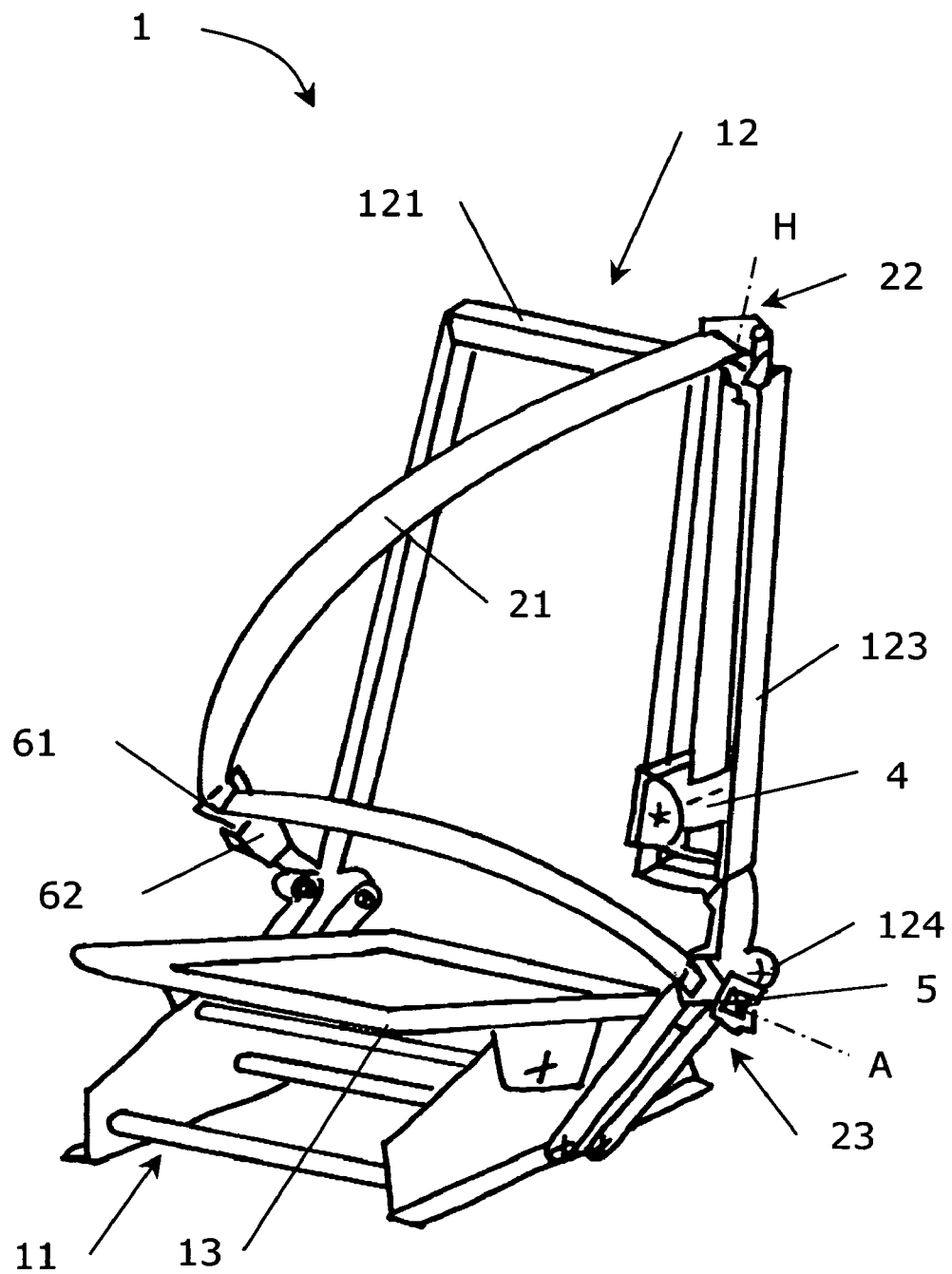
FIG. 3 is a perspective view of the reversible seat according to FIG. 1 in a second position of use.
Figure 4:
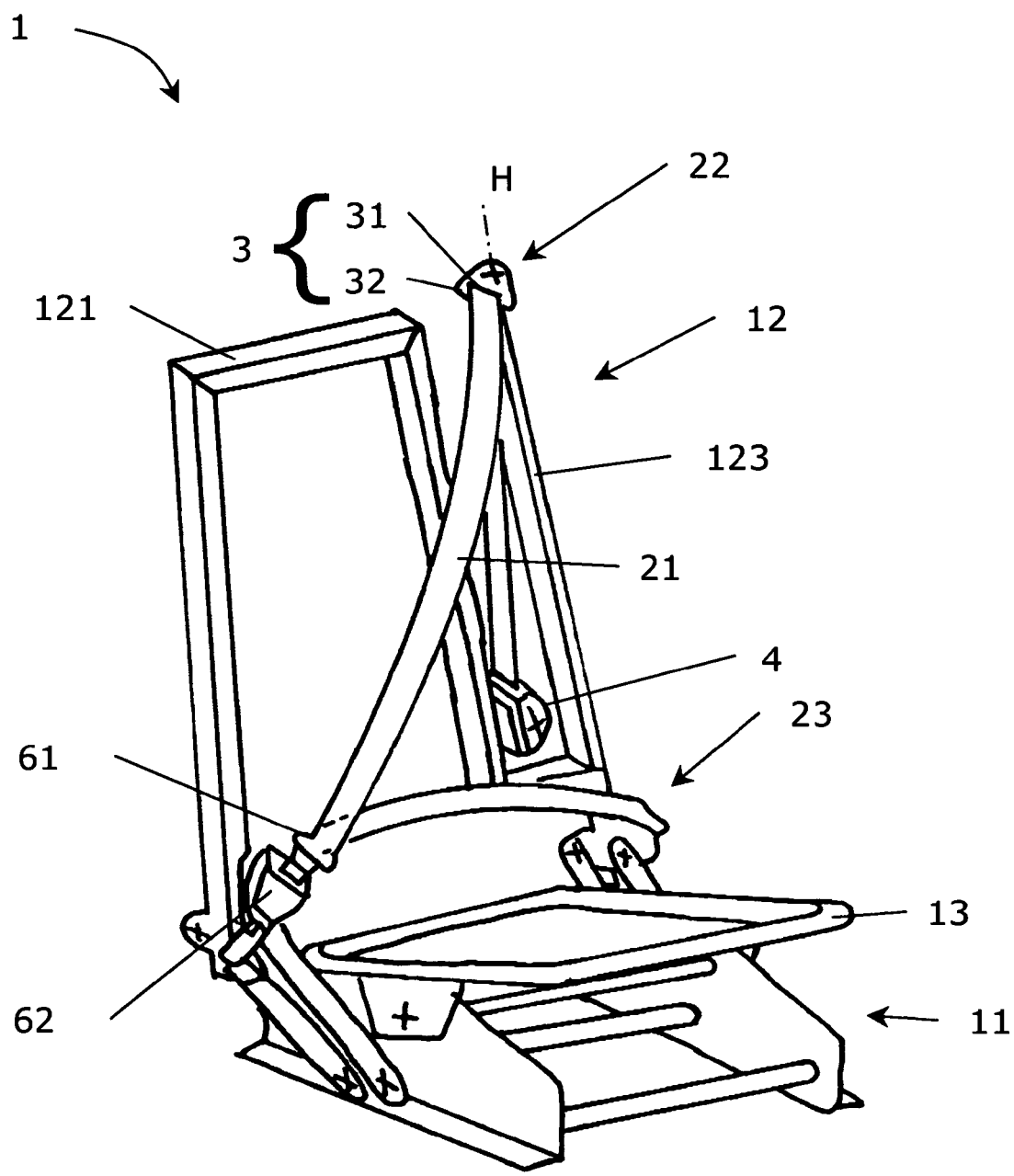
FIG. 4 is a perspective view of the reversible seat according to FIG. 3 from a different viewing angle.

In the second position of use of the reversible seat 1 according to FIG. 3 and FIG. 4, the backrest 12 is located with an upper edge 121 projecting slightly to the right at the right end of the seat surface 13. Accordingly, the reversible seat 1 may be used with the viewing direction towards the left. In this second position of use, the seat belt 21 according to the illustration has to be guided on the left side in front of the backrest 12 and along the passenger.

To assist the reversing function disclosed above, all fitting elements 3, 4, 5, 6 are advantageously arranged on the backrest 12 of the reversible seat 1. A special design with regard to the reversing function is not required for the belt retractor 4 and the seat belt buckle 6. The belt retractor 4 is expediently attached to a side edge of the backrest 12 or in a cavity provided therefore inside the backrest 12.

In order to allow an alteration to the guidance of the seat belt 21 when changing between the two disclosed positions of use of the reversible seat 1, specially designed fitting elements 3, 5 are provided, according to the invention, in the upper deflection position 22 and in the lower connecting point 23. Preferably all these fitting elements 3, 5 are secured relative to the backrest 12. Details regarding the construction and mode of operation of these fitting elements 3, 5 are disclosed in more detail hereinafter.

A lug 3 with an elongate slot 31 or a D ring is pivotally attached to the top of the backrest 12 at the side, in the upper deflection position 22 of the seat belt 21. In this connection, the envisaged pivot axis "H" preferably extends in the plane of the backrest 12 or at a short distance parallel thereto. Particularly preferably, the pivot axis "H" also extends approximately parallel to the side edges of the backrest 12. In particular in the embodiment shown, it is expedient to align the pivot axis "H" approximately parallel to the lateral tube 123 of the support structure of the backrest 12. The deflection edge 32 defined by the slot 31 in the lug 3 for the belt 21 may be pivoted about this pivot axis "H" by approximately one full rotation. The deflection edge 32 is preferably aligned approximately transversely to the pivot axis "H".

Figure 5:
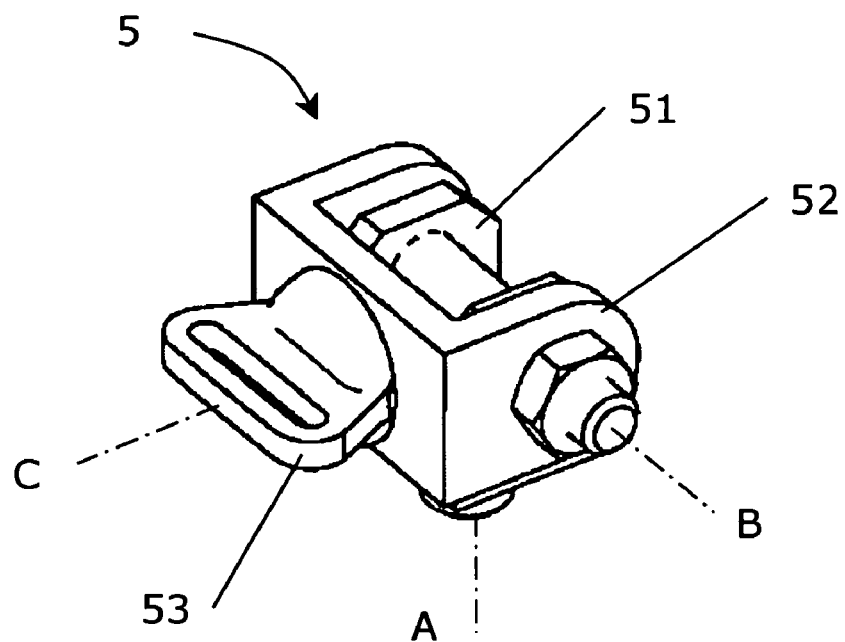
FIG. 5 is a perspective detailed view of the fitting for the lower connecting point of the seat belt to the reversible seat according to FIG. 1.
Figure 6:
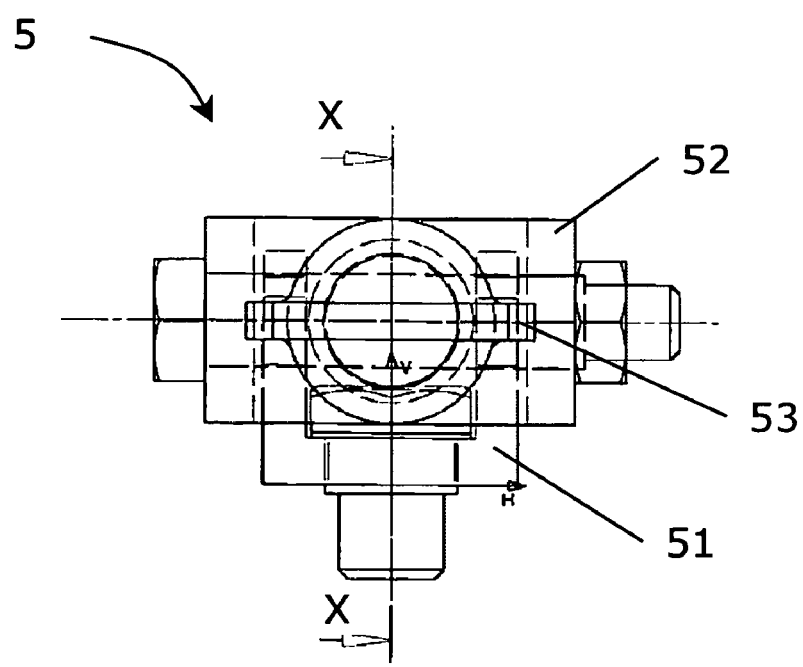
FIG. 6 is a side view of the fitting according to FIG. 5 from the front.
Figure 7:
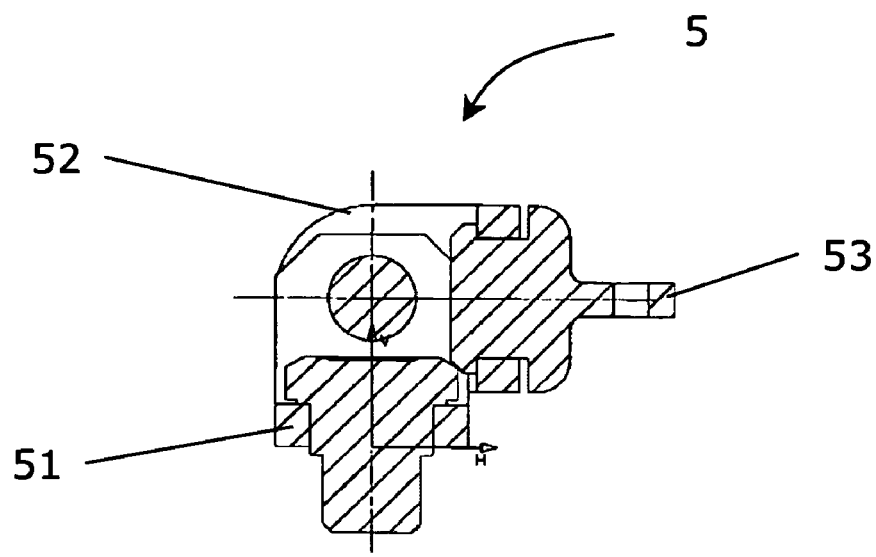
FIG. 7 is a sectional view through the fitting in the plane X-X according to FIG. 6.
Figure 8:
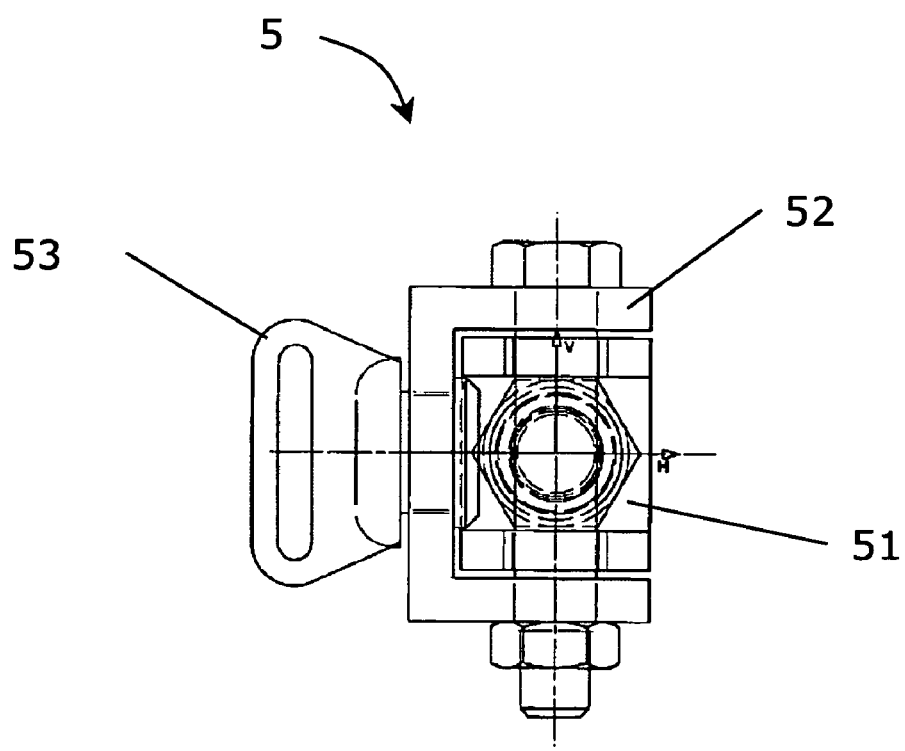
FIG. 8 is a plan view of the fitting according to FIG. 5.

Again according to FIG. 1 to FIG. 4, the lower connecting point 23 is arranged on the same side as the upper deflection point 22, laterally on the outside of the backrest 12. In order to allow a comfortable seat belt fastening position, the lower connecting point 23 is preferably also located at a short distance below the seat surface 13 on a downwardly extending part of the seat structure or a special radial arm 124. The seat belt 21 is held at the lower connecting point 23 by an articulated end fitting 5 with a plurality of pivot axes. The articulated end fitting 5 also comprises, in particular, according to FIG. 5, a connecting part 51 which is pivotally attached about a first axis "A" on the outer edge of the backrest 12. An intermediate part 52 is pivotally held in the connecting part 51 about a further axis "B". Preferably, the further axis "B" extends approximately perpendicular to the first axis "A". A flat lug 53 for connecting the seat belt 21 is arranged in the intermediate part 52 of the articulated end fitting 5. The flat lug 53 is fully rotatably mounted in the intermediate part 52 about the envisaged pulling direction "C" of the seat belt 21.

For the correct functioning of the articulated end fitting 5 shown, when reversing the reversible seat 1, the complete rotatability of the flat lug 53 in the intermediate part 52 about the axis "C" is necessary. However, a rotatability with regard to the two further axes "A" and "B" of the articulated end fitting 5 is not required. A pivotability in a range of approximately one half rotation has to be provided about one of the two axes "A" and "B", whereas with regard to the other axis a pivotability about a markedly smaller angle is sufficient.

When reversing the reversible seat 1, the seat belt buckle 6 has to be opened, i.e. the retaining tongue 61 and latch 62 of the seat belt buckle 6 are separated. The seat belt is then merely held on the reversible seat 1 by the articulated end fitting 5, the deflection fitting 3 and the belt retractor 4. When tilting the backrest 12, the user wraps the free part of the seat belt with the retaining tongue 61 around the outside of the backrest 12. The deflection fitting 3 is therefore slightly pivoted about the axis "H". The articulated end fitting 5 adopts the new pulling direction of the seat belt 21 by a pivoting movement about one of the axes "A" or "B". As a result of the wrapping of the seat belt 21, said seat belt is twisted into itself. By a rotation of the flat lug 53 about the pulling direction of the seat belt 21, i.e. the axis "C", this twisting is easily remedied by the user.

Naturally, as an alternative to the disclosed embodiment of the articulated end fitting 5 in the manner of a universal joint, double joint or double axis joint with a further inner axis of rotation "C" in the pulling direction of the seat belt 21, a ball joint may also be used to connect the seat belt 21.

Furthermore, as an alternative to the position shown and previously disclosed in FIG. 1 to FIG. 4, the belt retractor 4 may also be arranged inside the backrest 12 on its side edge in the region between the upper deflection point 22 and the lower connecting point 23.

Departing from the arrangement shown in FIG. 1 to FIG. 4, the deflection fitting 3 may also be pivotally attached to the upper deflection point 22 about a horizontal axis approximately parallel to the centre plane of the backrest. In this connection, however, a sufficient height of the backrest 12 is required in order to achieve guidance of the belt which is reliable and as straight as possible over the shoulder of the passenger.

Figure 9:
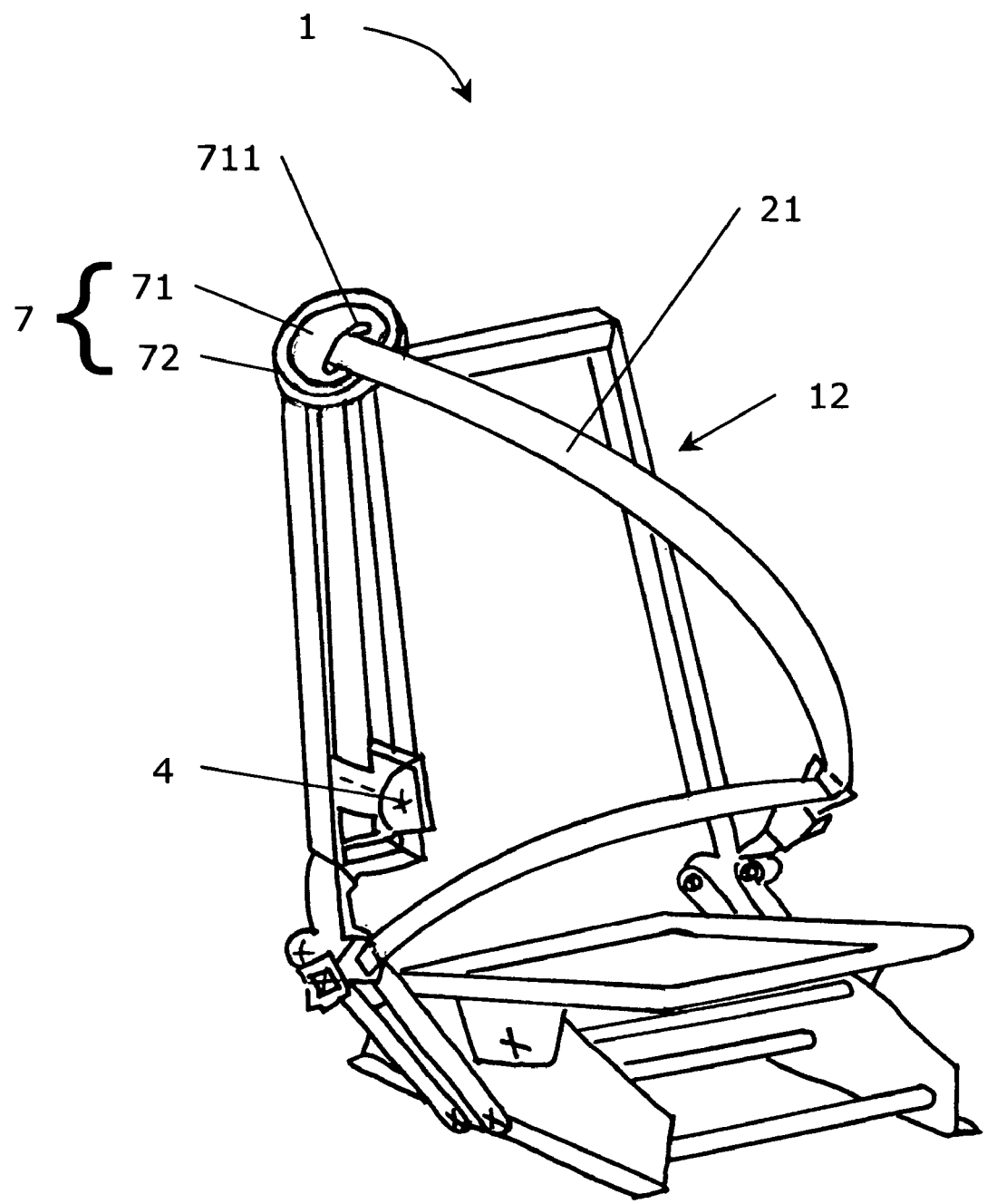
FIG. 9 is a perspective view of a reversible seat with an alternative embodiment for the upper deflection fitting.

An alternative design for the upper deflection fitting is shown and illustrated in FIG. 9. The upper deflection fitting 7, shown here, provides a disc 71 rotatably held in an aperture in the backrest 12. The aperture is defined on the illustrated seat structure by the receiving ring 72 for the disc 71. In this connection, the seat belt 21 extends through an elongate through-hole 711 in this disc 71. Due to the rotatable mounting of the disc 71, the elongate through-hole 711 may be suitably aligned with the pulling direction of the seat belt 21. The elongate through-hole 711 is preferably designed in the manner of a curved slot. The disc 71 may be rotated in the aperture 72, preferably by at least two thirds of a rotation.

LIST OF REFERENCE NUMERALS

Reversible seat 1
  Seat base 11
  Backrest 12
    Upper edge 121
    Support structure, lateral tube 123
    Radial arm 124
  Seat surface 13
Seat belt arrangement 2
  Seat belt 21
  Upper deflection point 22
  Lower connecting point 23
  Lug 3
    Slot 31
    Deflection edge 32
  Belt retractor 4
  Articulated end fitting 5
    Connecting part 51
    Intermediate part 52
    Flat lug 53
  Seat belt buckle 6
    Retaining tongue 61
    Latch 62
Alternative upper deflection fitting 7
  Disc 71
    Through-hole 711
  Receiving ring 72

The invention claimed is:

1. A reversible seat for a vehicle having a backrest with an upper end and a lower end, and an articulated end fitting for connecting a seat belt to said reversible seat, said articulated end fitting being arranged in a region of the lower end of the seat backrest and comprising a connecting part and a projecting elongate lug connected thereto for suspending a seat belt, whereby said elongate lug being rotatable about an axis extending approximately in a pulling direction of the seat belt.

2. A reversible seat according to claim 1, including a second fitting element which is arranged on the side of the first articulated fitting element in the region of the upper end of the backrest and defines a deflection edge for the seat belt, the deflection edge being pivotable about an axis located approximately in a plane defined by the backrest.

3. A reversible seat for a motor vehicle having a backrest, a seat belt and a belt retractor, and comprising an upper deflection fitting for the seat belt arranged on the backrest and the belt retractor being arranged in a space within the backrest, the upper deflection fitting comprising a disc rotatably held in an aperture in the backrest with an elongate through-hole for the emergence of the seat belt from the backrest, thereby the disc being rotatable about an axis located approximately in a plane defined by the backrest.

4. A reversible seat according to claim 3, wherein the elongate through-hole is configured as a curved slot.

5. A reversible seat according to claim 4, wherein the aperture in the backrest is established by a receiving ring.

6. A reversible seat according to claim 3, wherein the aperture in the backrest is established by a receiving ring.

7. A reversible seat for a vehicle having a backrest with an upper end and a lower end, a seat belt, and an articulated end fitting being for connecting the seat belt to the reversible seat, said articulated end being arranged in a region of the lower end of the seat backrest and comprising a connecting part and a projecting elongate lug connected thereto for suspending the seat belt, the elongate lug being rotatable about an axis extending approximately in a pulling direction of the seat belt, wherein the elongate lug is pivotable relative to the connecting part about two further variable axes.

8. A reversible seat according to claim 7, wherein the connecting part and the elongate lug are connected by one of a universal joint, double joint and double axis joint, and wherein the elongate lug is further pivotably movably held or rotatably movably held about the pulling direction of the seat belt.

9. A reversible seat according to claim 7 and including a second fitting element being arranged in a region of the upper end of the backrest on the same side of the backrest as the first articulated fitting element which defines a deflection edge for the seat belt, the deflection edge being pivotable about an axis located approximately in a plane defined by the backrest.

10. A reversible seat for a vehicle having a backrest with an upper end and a lower end, a seat belt and an articulated end fitting for connecting the seat belt to said reversible seat, said articulated end fitting being arranged in a region of the lower end of the backrest and comprising a connecting part and a projecting elongate lug connected thereto for suspending said seat belt, the elongate lug being rotatable about an axis extending approximately in a pulling direction of the seat belt, the connecting part and the elongate lug being connected by a ball joint on the articulated end fitting.

11. A reversible seat according to claim 10, including a second fitting element which is arranged on the side of the first articulated fitting element in the region of the upper end of the backrest and defines a deflection edge for the seat belt, the deflection edge being pivotable about an axis located approximately in a plane defined by the backrest.

12. A reversible seat according to claim 2, wherein the elongate lug of the connecting part is fully rotatable about the pulling direction of the seat belt.

13. A reversible seat according to claim 12, wherein said connecting part and said elongate lug being connected by one of a universal joint, double joint and double axis joint, and wherein the elongate lug being further pivotably movably held or rotatably movably held about the pulling direction of the seat belt.

\* \* \* \* \*